May 30, 1961  G. L. HINCKLEY  2,986,728
ELECTRICAL COMPUTING DEVICES
Filed Feb. 2, 1955  3 Sheets-Sheet 1

Garfield Louis Hinckley
Inventor
By Henry M. Saragovitz
Attorney

Garfield Louis Hinckley
Inventor
By Harry M. Saragovitz
Attorney

United States Patent Office 2,986,728
Patented May 30, 1961

2,986,728
ELECTRICAL COMPUTING DEVICES
Garfield Louis Hinckley, Fleet, England, assignor to the Minister of Supply in Her Majesty's Government of the United Kingdom of Great Britain and Northern Ireland, London, England
Filed Feb. 2, 1955, Ser. No. 488,003
5 Claims. (Cl. 343—5)

This invention relates to electrical computing devices.
According to the present invention, an electrical computing device for determining the product of two single-valued functions comprises an oscillator, means for controlling the frequency of the oscillator according to the value of one function and a digital counter connected to the oscillator for counting the number of cycles of oscillation of the oscillator occurring during an interval of time the length of which is dependent on the value of the other function.

According to a feature of the present invention, the electrical computing device may be combined with radio object locating apparatus to provide an indication in digital form of, for example, the azimuthal cartesian co-ordinates of a reflecting object.

In order that the invention may be more easily understood, embodiments thereof will now be described, by way of example.

Figure 1:
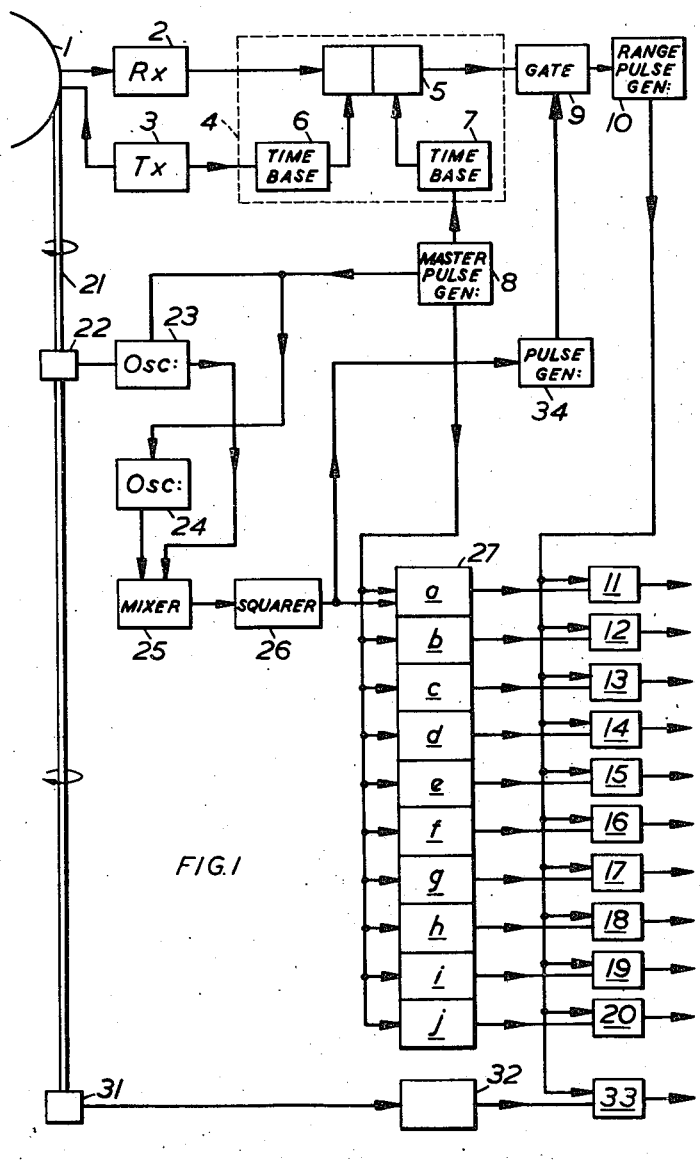
Figure 2:
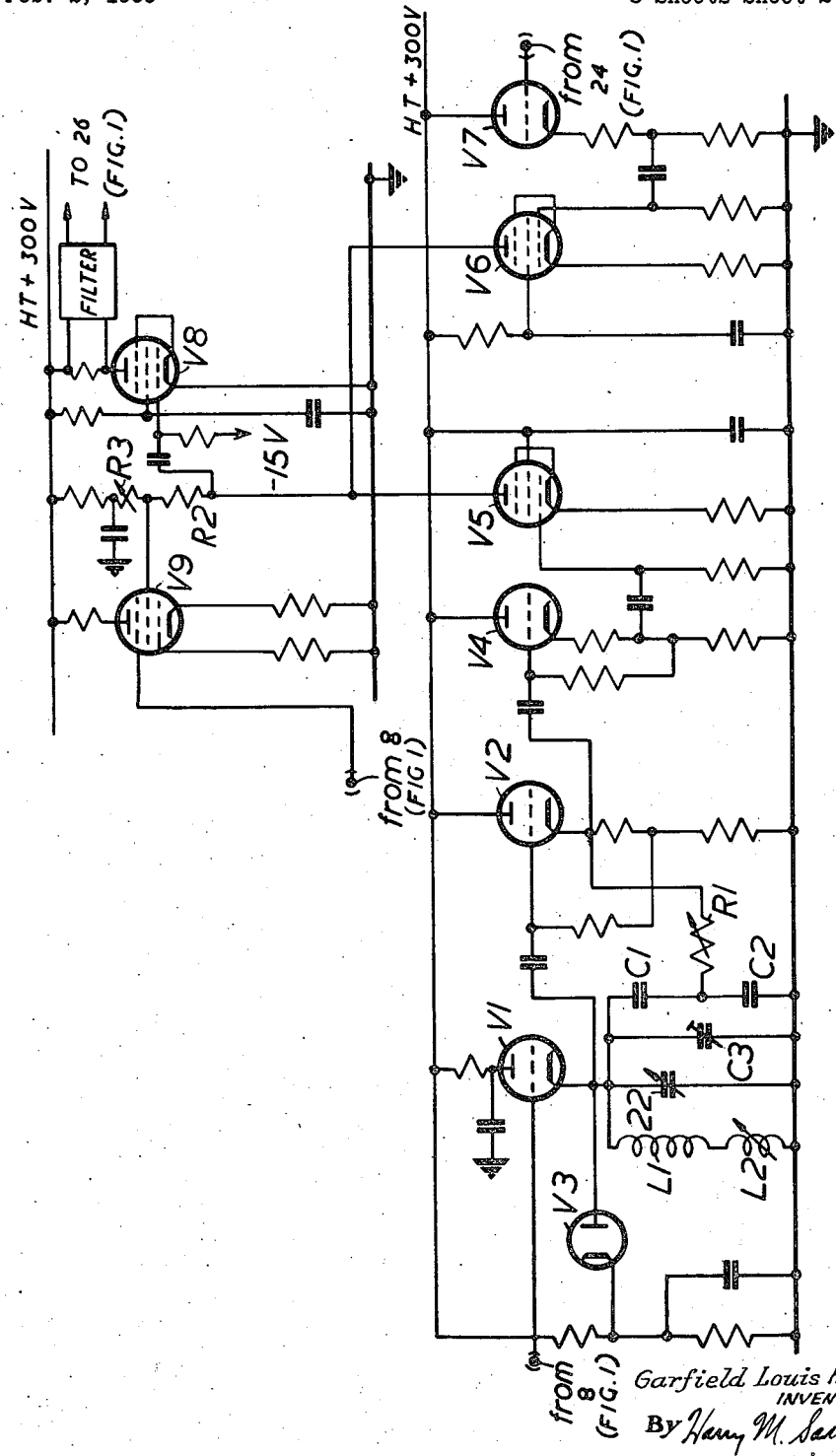
Figure 3:
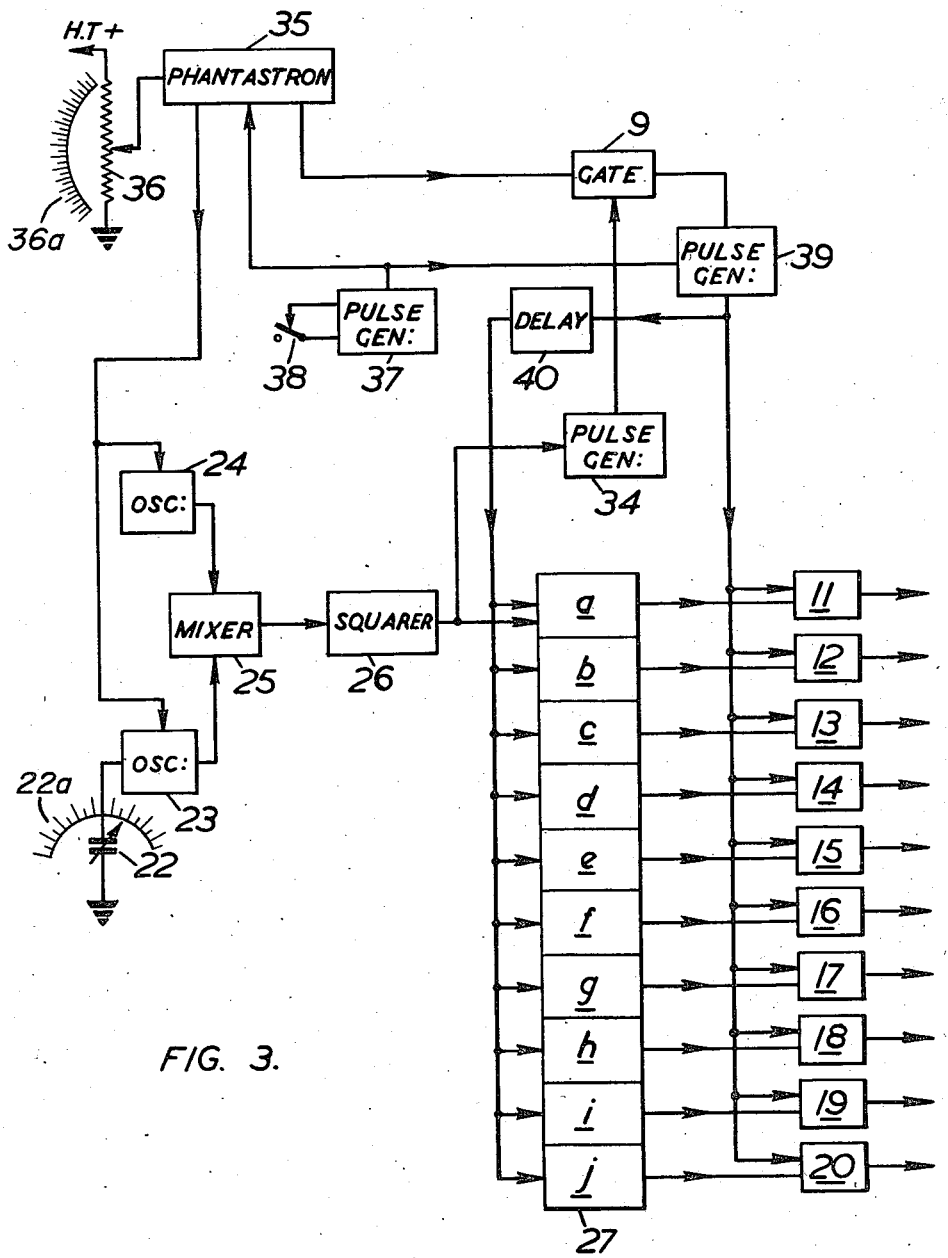

Referring now to the accompanying drawings:
Figure 1 is a circuit diagram of a radio object locating apparatus and part of an encoder for encoding data obtained therefrom,
Figure 2 is a circuit diagram of an oscillator and mixer employed in the circuit shown in Figure 1 and
Figure 3 is a circuit diagram of a computer.

Figure 1 shows, in schematic form, a part of a circuit for encoding data obtained from a radio object locating apparatus in the form of the polar co-ordinates of the position of an object into digital form representing the cartesian co-ordinates of the position of the object. In the drawing there are shown a direction aerial 1, a receiver 2, a transmitter 3, and an accumulator 4 which form part of a radio object locating apparatus of the type in which an exploratory pulse of radio frequency generated by the transmitter 3 is radiated in a predetermined direction in space and a return or echo pulse received at the apparatus indicates the presence of a reflecting object in the path of the radiation. The time interval which elapses between the radiation of the exploratory pulse and the return of the echo pulse is a measure of the range of the object and this time interval is recorded in the accumulator 4. The azimuthal angle of the object is indicated by the direction along which the directional aerial is aligned.

The accumulator 4 comprises a cathode ray storage tube 5, a writing time-base circuit 6 and a reading time-base circuit 7. The time-base circuits 6 and 7 control the scanning of the writing electron beam and the reading electron beam respectively of the cathode ray storage tube 5. This time-base circuit 6 is synchronised from the transmitter 3. The time interval representing the range of the reflecting object is recorded in the storage tube 5 by recording the echo pulse from the video frequency output of the receiver 2 at a point on the storage tube screen determined by the distance that the writing electron beam travels, from a predetermined position, representing zero range, along a predetermined scanning path on the screen of the storage tube during the time interval.

The time-base circuit 7 is controlled to operate at a sub-multiple of the frequency of operation of the time base circuit 6 by means of a master pulse generator 8. When the reading electron beam, scanning under the control of the time-base circuit 7, reaches the point on the storage tube screen at which the echo pulse is stored, an output pulse is passed to a gate 9 which is normally open. When the gate 9 is open the output pulse is passed to a range pulse generator 10 which produces a square-wave output each time an output pulse is passed to it. This square-wave output is fed to a plurality of gates 11 to 20. The range pulse generator 10 may comprise an amplifier and a limiter.

The aerial 1 is connected through a shaft 21 to a variable capacitor 22. A beat frequency oscillator comprises a variable-frequency oscillator 23 of which the variable capacitor 22 forms part of the tuned circuit, a fixed frequency oscillator 24 and a mixer 25. The mixer 25 includes filter networks and is arranged to provide at its output a signal having a frequency which is the difference between the frequencies of oscillation of the variable-frequency and the fixed-frequency oscillators. The output from the mixer 25 is connected to a squarer 26, which is arranged to provide a square-wave output once per cycle of oscillation of the mixer output. The squarer 26 may comprise a flip-flop circuit (that is to say, a two-state trigger circuit having only one stable state).

The output of the squarer 26 is connected to a binary digital counter 27 which comprises ten multivibrator circuits (which are illustrated at $a$ to $j$) connected in cascade. The multivibrator circuits are so arranged that each pulse from the squarer 26 causes a change in the state of the first multivibrator circuit $a$, every second pulse causes a change in the state of the second multivibrator circuit $b$, every fourth pulse causes a change in the state of the third multivibrator circuit $c$ and so on. Thus every five-hundred-and-twelfth pulse from the squarer changes the state of the tenth multivibrator $j$ so that the whole binary digital counter 27 may be in any one of 1024 different states.

Each multivibrator in the binary digital counter 27 is connected to a separate one of the gates, 11, 12, 13, 14, 15, 16, 17, 18, 19 and 20 in such a manner that when multivibrator is in one state, the gate is open and when the multivibrator is in the other state the gate is closed. When a gate is open it is able to pass a pulse from the output of the range pulse generator 10 to the output of the encoder.

The master pulse generator 8 controls the oscillators 23 and 24 so that they are quiescent except during the duration of each reading scan of the storage tube 5. When a reading scan commences the oscillators are caused to oscillate so that the oscillations of each of the oscillators always start coherently in the same phase. At the end of each reading scan of the cathode-ray storage tube 5, the multivibrators in the counter 27 are all reset by an output from the master pulse generator 8 so that the gates 11 to 20 are all shut. The reading scan of the electron beam of the storage tube 5 starts at the position on the screen representing zero range and then scans along the direction on the screen of increasing range so that a pulse output from the range pulse generator 10 representing an echo pulse will occur at a time after the start of the scan which is proportional to the range of the object which originally produced the echo.

The capacitor 22 has plates so shaped that the frequency of the oscillator 23 varies so as to produce an output from the mixer 25 which has a frequency proportional to the sine of the azimuthal angle $\theta$ of the direction of reception of the aerial 1 with reference to the predetermined direction. The aerial may at all material times be considered to be stationary during the total period of writing into and reading from the accumulator 4. Thus the frequency of the output from the mixer 25 may be considered as representing the sine of the azimuthal bearing of an object causing a pulse to be read from the storage tube.

Thus, if $f_\theta$ is the frequency of the output from the mixer 25 for a given azimuthal angle, $\theta$, of the direction of reception of the aerial 1 and $t_R$ is the time after the start of the reading scan of the storage tube 5 at which an output pulse from the range pulse generator 10 is passed to the gates 11 to 20, the number of pulses fed to the counter 27 in the time $t_R$ will be $f_\theta.t_R$. At the time $t_R$ the binary counter 27 will be in a state determined by the number $f_\theta.t_R$ expressed in the binary scale of notation. Each of the gates 11 to 20 will similarly be open or closed according to the number $f_\theta.t_R$. For instance, if $f_\theta t_R = 27$, then the gates 11, 12, 14 and 15 would be open to pass any pulse derived from the accumulator 4 at time $t_R$ to the output of the encoder, and the gates 13 and 16 to 20 would be closed. The encoder would thus give at its output an expression 0000011011 representing the number 27 in the binary scale of notation.

It has already been idicated that $f_\theta$ is proportional to $\sin \theta$ and that $t_R$ is proportional to R, the range of the object causing the echo pulse written into the storage tube screen. Thus the number $f_\theta.t_R$ is proportional to R. $\sin \theta$. It follows that the output from the encoder is an indication of $R. \sin \theta$ which is one cartesian co-ordinate, with respect to the aerial 1 as origin, of the object causing the echo.

Conveniently, the frequency of the output from the mixer 25 can be arranged so that 1024 oscillations occur in one reading scan of the storage tube 5 when $\sin \theta$ is equal to unity. For instance, if the reading scan takes 21.46 milliseconds, the frequency of the mixer output will be 47.73 kc./s. When $\sin \theta$ is zero, the frequency of the mixer output is conveniently made zero. In this manner the best use is made of the binary counter 27 and its associated circuits.

The other cartesian co-ordinate of the position of the object causing the echo may be obtained by using an arrangement similar to that herein before described. However, in order to obtain an indication of $R. \cos \theta$, the output of the mixer 25 has a frequency which is proportional to $\cos \theta$. The same fixed-frequency oscillator 24 may be used as for the arrangement shown in the drawing.

The two cartesian co-ordinates $R. \sin \theta$ and $R. \cos \theta$ obtained in this manner suffer from an ambiguity of 180 degrees since the co-ordinates will appear to be the same for supplementary values of $\theta$, there being no differentiation in sign. This difficulty may be overcome by means of commutator such as the commutator 31 driven by a continuation of the shaft 21. The commutator 31 is connected through a two-state trigger circuit 32 to a gate 33 so as to open the gate when $\sin \theta$ is negative. When the gate 33 is open it allows an output pulse from the range pulse generator 10 to pass to the output of the encoder. This provides an eleventh binary digit to define $R. \sin \theta$ which, in conjunction with a similarly produced eleventh binary digit to define $R. \cos \theta$, resolves the ambiguity.

When any of the multivibrator circuits $a$ to $j$ are changing states, an output pulse from the accumulator 4 may occur. A wrong indication of the particular co-ordinate will then be given. This may be overcome by inhibiting, by means of the gate 9, the passage to the range pulse generator 10 of any output signal from the accumulator 4 while a change of state is taking place. In order to do this, a prohibitive period pulse generator 34 is connected between the gate 9 and the output of the squarer 26. This pulse generator is arranged to generate, under the control output of the squarer, a pulse commencing before each change of state of the first multivibrator $a$ and having a duration which is greater than the total time required for all the multivibrators in the counter 27 to change their states. This pulse controls the gate 9 to inhibit the passage of an output signal from the accumulator 4 to the range pulse generator 10.

Figure 2 is a more detailed circuit diagram of part of the oscillator and mixer circuits 23, 24 and 25 (Figure 1) and shows a triode valve V1 connected in its cathode circuit to a parallel tuned circuit comprising inductors L1 and L2, the variable capacitor 22 and capacitors C1, C2 and C3. The variable capacitor 22 is the same as that of the same reference illustrated in Figure 1. In the quiescent state the valve V1 is fully conducting and the tuned circuit is damped by the low cathode impedance of the valve V1. Therefore, no oscillations take place. However, when a long negative-going pulse from the master pulse generator 8 (Figure 1) is applied to the control grid of the valve V1, the tuned circuit is driven into oscillation by the rapid reduction of cathode current of the valve V1 as this valve is cut off.

A second triode valve V2 is part of a circuit designed to maintain the oscillation in the tuned circuit. The control grid of this valve is connected to the cathode of the valve V1. The valve V2 forms part of a cathode follower circuit and a resistor R1 forms a positive feedback path between the cathode of the valve V2 and the junction of the capacitors C1 and C2 in the tuned circuit. The value of the resistor R1 is so chosen that at the lowest frequency at which the oscillator is designed to operate (namely 452.322 kc./s.) the oscillations of the tuned circuit are just maintained. A suitably biased diode valve V3 is used to limit the amplitude of the oscillations at other frequencies of oscillation, the bias being so arranged that the diode valve just conducts at the lowest frequency of oscillation. The valve V2 is biased so as to work under class A conditions and the amplitude of the oscillations fed to this valve is kept small compared with the grid base of the valve.

The output from the oscillator is taken from the cathode of the valve V2 and is passed through a cathode follower valve V4 to the control grid of a pentode valve V5. This valve shares two anode load resistors R2 and R3 with another pentode valve V6 which is fed via a cathode follower V7 from the fixed frequency oscillator 24 shown in Figure 1. This oscillator (which is not shown in detail) is similar to the variable frequency oscillator comprising the valves V1, V2 and V3 with the exception that the variable capacitor 22 is omitted and the capacitances of the capacitors C1 and C2 are altered to cause the tuned circuit to oscillate at the required frequency.

It follows that oscillatory voltages from the variable-frequency oscillator and the fixed-frequency oscillator will appear across the resistors R2 and R3. These oscillatory voltages are impressed upon the control grid circuit of a square-law detector valve V8. The two oscillations, mixed in the square-law detector, are then fed to a filter circuit which is designed to pass all frequencies up to 100 kc./s. which includes all the possible difference frequencies obtainable by varying the variable-frequency oscillator through its range of frequencies.

Because the variable-frequency oscillator and the fixed-frequency oscillator are initially coherent and also because of the inherent action of a square-law detector, the output voltage waveform from the filter will be on a pedestal. In order substantially to reduce this pedestal, a further pentode valve V9 has its screen grid connected to the junction of the resistors R2 and R3. The valve V9 is normally cut off by means of a negative potential applied to its suppressor grid.

However, when a long positive-going pulse from the master pulse generator 8 (Figure 1) of length equal to the long negative-going pulse applied to the oscillators, is applied to the suppressor grid of the valve V9, current is drawn through the resistor R3. This resistor may be made adjustable in value so that the change in voltage across the resistor R3 may be made substantially to cancel the pedestal. In order to simplify the description with reference to Figure 1, the connection between the master pulse generator 8 and the mixer 25 is not shown in that figure.

Although the present invention has been described with reference to its use in an encoder for data obtained from a radio object locating apparatus, many other uses are envisaged for the invention. Indeed the invention may be used for obtaining a numerical indication of the product of any two single-valued functions, one of which is capable of being represented as an interval of time and the other of which is capable of being represented as the frequency of oscillation of an oscillator. For example, the invention may be used to provide the modulus of the product of two numbers. In this case the variable capacitor 22 in the drawing is so adapted that the frequency of the output from the mixer 25 varies linearly with the angular rotation of the condenser. A given number, say the multiplicand to be used in a computation, is then set up directly on a calibrated scale or dial 22a co-operating with the condenser spindle. The time interval over which the number of oscillations of the mixer output are to be counted are made proportional to, say, the multiplier to be used in the computation. This may conveniently be achieved by substituting for the accumulator 4 shown in Figure 1, the well-known phantastron circuit described in British specification No. 582,758.

This circuit comprises a pentode valve, the anode voltage of which runs down linearly when the circuit is triggered by means of a positive pulse applied to the suppressor grid of the valve and then returns to a state ready for retriggering when the linear run-down ends. The output voltage from the screen grid of the valve changes abruptly at the beginning and end of the fall in the anode voltage of the valve. The duration of the fall of the anode voltage is controlled by the initial anode voltage before the fall takes place. The initial anode voltage is controlled by means of a potentiometer connected through a diode valve to the anode of the pentode valve. The potentiometer may be calibrated directly in terms of the magnitude of the multiplier.

A fall in the voltage of the screen grid of the pentode valve at the beginning of the anode voltage fall is used coherently to start the oscillators of the beat frequency oscillator. The output from the screen grid of the pentode valve at the end of the anode voltage fall is used to provide a pulse which passes through those of the gates which are opened by the counter stages.

Figure 3 is a circuit diagram of a computer employing a phantastron circuit in this manner. In this figure, circuit elements which are similar to those shown in Figure 1 are designated by the same reference numerals as are those elements in Figure 1. Additionally, there are shown a phantastron circuit 35 and a potentiometer 36. This potentiometer determines the initial anode voltage before the run-down in anode voltage takes place and carries a scale or dial 36a calibrated in terms of the magnitude of, say, a multiplier.

An output of the phantastron (from its screen-grid circuit) is connected to the variable frequency oscillator 23 and fixed frequency oscillator 24 so as to apply a negative-going pulse thereto during the anode voltage run-down of the phantastron circuit. This negative-going pulse is, in fact, applied to the control grids of the oscillator valves such as the valve V1 in Figure 2, in order to allow electrical oscillations to take place in the tuned circuits of the oscillators. A similar, but inverted, positive-going pulse is applied to the grids of the valves such as the valve V9 in order to counteract the pedestal in the detected outputs of the mixer. This inversion may be carried out by means of a single amplifier stage (not shown).

A pulse generator 37 is arranged to initiate the anode voltage run-down of the phantastron 35 by applying a short positive-going pulse to the suppressor grid of the phantastron whenever a switch 38 is closed. A pulse generator 39 is connected to the pulse generator 37 so that the pulse generated by the pulse generator 37 conditions the pulse generator 39 to generate a pulse when a positive-going voltage from the phantastron screen grid circuit is first applied to it. Interposed between the phantastron circuit 35 and the pulse generator 39 is a gate 9 which prevents any positive-going voltage from the phantastron circuit 35 reaching the pulse generator 39 when the counter 27 is changing state. In order that the gate 9 may do this, the pulse generator 34 provides a pulse to shut the gate 9 each time there is an output from the squarer 26 such that the state of the counter 27 is changed.

As in the case of the circuit shown in Figure 1 the squarer 26 is energised from the output of the mixer 25 which combines and filters the outputs from the fixed-frequency oscillator 24 and the variable-frequency oscillator 23. Part of the tuned circuit of the oscillator 23 comprises the variable capacitor 22. This capacitor carries a scale 22a which is calibrated in terms of the magnitude of, say a multiplicand.

At the end of each operation of the circuit, the counter 27 is reset by means of the pulse from the pulse generator 39 which is first passed through a delay unit 40. This delay unit allows sufficient time for the outputs from the gates 11 to 20 to be read or, alternatively, staticized before the counter 27 is reset.

The operation of the computer circuit is similar to that of the circuit shown in Figure 1 and will now be described briefly. Firstly, the multiplier and multiplicand are set up on the calibrated scales or dials 36a and 22a associated with the potentiometer 36 and the capacitor 22 respectively. The switch 38 is then closed and a pulse from the pulse generator 37 triggers the phantastron. The screen grid voltage of the phantastron decreases rapidly and coherently initiates oscillations in the oscillators 23 and 24. The number of cycles of oscillation at the difference frequency of the oscillations (determined by the setting of the condenser 22) is then counted by the counter 27 until the phantastron screen grid voltage of the phantastron circuit rises, when a pulse from the pulse generator 39 is passed to all of the gates 11 to 20. This pulse passes through those of the gates 11 to 20 which are opened by the outputs from the stages a to j of the counter 27.

The number of cycles of oscillation counted during the period of time determined by the setting of the potentiometer 36 are, therefore, represented in binary form by the outputs from the gates 11 to 20. By suitable calibration of the dials of the potentiometer 36 and the capacitor 22, the outputs from the gates 11 to 20 may be made to represent the product of the multiplier and the multiplicand directly in the binary scale of notation.

Division may be carried out by the circuit of Figure 3 if either the potentiometer or the capacitor is calibrated so that the multiplication takes place by a number the reciprocal of which is marked on the calibration.

It will be understood that the use of the counter 27 is described by way of example only and that any other counter which will provide the resultant product in any other numerical scale of notation may be employed. For instance, a series combination of scale-of-ten counters, such as cold cathode scale-of-ten counters may be used to give an answer in decimal form representing the product of two functions.

I claim:

1. A digital computing device for determining the product of two functions the analogue value of which may be set up on two calibrated dials comprising, oscillator means, capacitor means for controlling the frequency of the oscillator means, a calibrated dial on said capacitor for setting the oscillator frequency to a value corresponding to one of said functions, means for converting the oscillations of the oscillator into a corresponding series of pulses, a digital counter for counting said pulses, phantastron circuit means for determining an interval of time, a potentiometer having a calibrated dial and connected to an electrode of said phantastron for setting said interval of time in accordance with the value of the other function an output means connected to said counter, means connecting said phantastron circuit to said oscillator for initiating oscillations therein and to said output means to provide an output therefrom at the end of said time interval, whereby the number of pulses is a product of the frequency set on said capacitor dial and the time interval set on said potentiometer dial.

2. A digital computing device for determining the product of two single-valued functions comprising: oscillator means, means for adjusting the frequency of said oscillator means in accordance with one of said functions, means for converting the output of said oscillator means into a corresponding series of pulses, means for determining a time interval the length of which is determined by the other of said functions including means for producing a time-interval pulse at the end of said time interval, a digital counter for counting the number of said pulses, output means connected to said counter, and means connecting said means for producing to said output means, whereby the time interval pulse from said means for determining produces an output from said output means representative of the product of said two functions.

3. A computing device in accordance with claim 2 wherein the means for determining said time interval comprises: a radar object locating apparatus, means for initiating oscillations in said oscillator at a time representative of the time of transmission of a signal from said apparatus, and means for producing said time interval pulse at a time representative of the receipt of echo signals at said apparatus.

4. An electrical computing device as defined in claim 2 wherein the means for adjusting the frequency of the oscillator means comprises a radio object locator having a directional aerial and including a variable capacitor coupled to the aerial and arranged to be varied in accordance with the angular deviation of the aerial from a datum line, the variable capacitor forming part of a tuned circuit of the oscillator and having a capacity variation characteristic such that the oscillation frequency of the oscillator varies as the sine of the said angular deviation from said datum line.

5. An electrical computing device for determining a product as defined in claim 2 wherein the means for adjusting the frequency of the oscillator is a radio object locator having a directional aerial with a variable capacitor coupled thereto and wherein the sign of the product becomes indeterminate for certain azimuthal angles when one of the functions is a trigonometric function of the angle, means for avoiding said indeterminacy including a commutator coupled to said aerial to indicate the sign of the product.

References Cited in the file of this patent

UNITED STATES PATENTS

| | | |
|---|---|---|
| 2,433,385 | Miller | Dec. 30, 1947 |
| 2,516,189 | Dinsmore | July 25, 1950 |
| 2,651,204 | Dickinson | Sept. 8, 1953 |
| 2,672,284 | Dickinson | Mar. 16, 1954 |